(12) United States Patent
Richiuso et al.

(10) Patent No.: US 6,276,847 B1
(45) Date of Patent: Aug. 21, 2001

(54) SHUTTER MECHANISM INCLUDING SELF-TIMER WITH SHAPED MEMORY ALLOY CONTROL FOR CAMERA

(75) Inventors: Leonard Richiuso; Robert J. Stanchus, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/478,638

(22) Filed: Jan. 6, 2000

(51) Int. Cl.[7] .................................................. G03B 9/64
(52) U.S. Cl. ................................. 396/472; 396/502
(58) Field of Search .................................. 396/264, 472, 396/473, 452, 493, 502, 286

(56) References Cited

U.S. PATENT DOCUMENTS 4,664,493 * 5/1987 Takagi .................................... 396/452
4,860,040 * 8/1989 Tamamura et al. .................... 396/89
5,105,213   4/1992 Takahashi .
5,150,702 * 9/1992 Miyanaga et al. .................... 396/505
5,185,621 * 2/1993 Kagechika ............................ 396/452
5,459,544  10/1995 Emura .

* cited by examiner

*Primary Examiner*—Alan A. Mathews
(74) *Attorney, Agent, or Firm*—Roger A. Fields

(57) ABSTRACT

A shutter mechanism comprising a shutter that is operated to allow the passage of light, and a self-timer with a shaped memory alloy control that can be deformed and that when subjected to electrical current heats to recover from being deformed and after some delay during recovery initiates operation of the shutter, is characterized in that a manually set timer member is connected to the shaped memory alloy control and is supported to be manually moved to deform the shaped memory alloy control to set the self-timer and for the shaped memory alloy control to reverse-move the timer member during recovery of the shaped memory alloy control.

12 Claims, 10 Drawing Sheets

SHUTTER MECHANISM INCLUDING SELF-TIMER WITH SHAPED MEMORY ALLOY CONTROL FOR CAMERA

FIELD OF THE INVENTION

The invention relates generally to the field of photography, and in particular to cameras. More specifically, the invention relates to a shutter mechanism including a self-timer with a shaped memory alloy control.

BACKGROUND OF THE INVENTION

A shutter controls the time during which light is allowed to reach the sensitized material in a camera. The shutter consists of some means of normally covering the taking lens, the aperture stop, or the film light-tight, uncovering it for a brief time and then covering it up again.

A self-timer is a delayed action release for the shutter. The self-timer, when set, delays operation of the shutter for a certain time. This, for example, enables the photographer to place himself in front of the camera to be photographed.

Prior art U.S. Pat. No. 5,459,544 issued Oct. 17, 1995 proposes that the self-timer have a shaped memory alloy control for delaying operation of the shutter. The shaped memory alloy control is a metallic fine wire that is mechanically deformed (stretched) lengthwise via a spring and that when subjected to electrical current heats (because of its electrical resistance) to recover (shrink) lengthwise from being deformed and after some delay during recovery initiates operation of a shutter. When the electrical current is discontinued, the wire cools which allows the spring to again deform (stretch) the wire.

SUMMARY OF THE INVENTION

A shutter mechanism comprising a shutter that is operated to allow the passage of light, and a self-timer with a shaped memory alloy control that can be deformed and that when subjected to electrical current heats to recover from being deformed and after some delay during recovery initiates operation of the shutter, is characterized in that:

a manually set timer member is connected to the shaped memory alloy control and is supported to be manually moved to deform the shaped memory alloy control to set the self-timer and for the shaped memory alloy control to reverse-move the timer member during recovery of the shaped memory alloy control.

DETAILED DESCRIPTION OF THE INVENTION

The invention is disclosed as being embodied preferably in shutter mechanism including a self-timer, for a camera. Because the features of such a shutter mechanism are generally known, the description which follows is directed in particular only to those elements forming part of or cooperating directly with the disclosed embodiment. It is to be understood, however, that other elements may take various forms known to a person of ordinary skill in the art.

Figure 1:
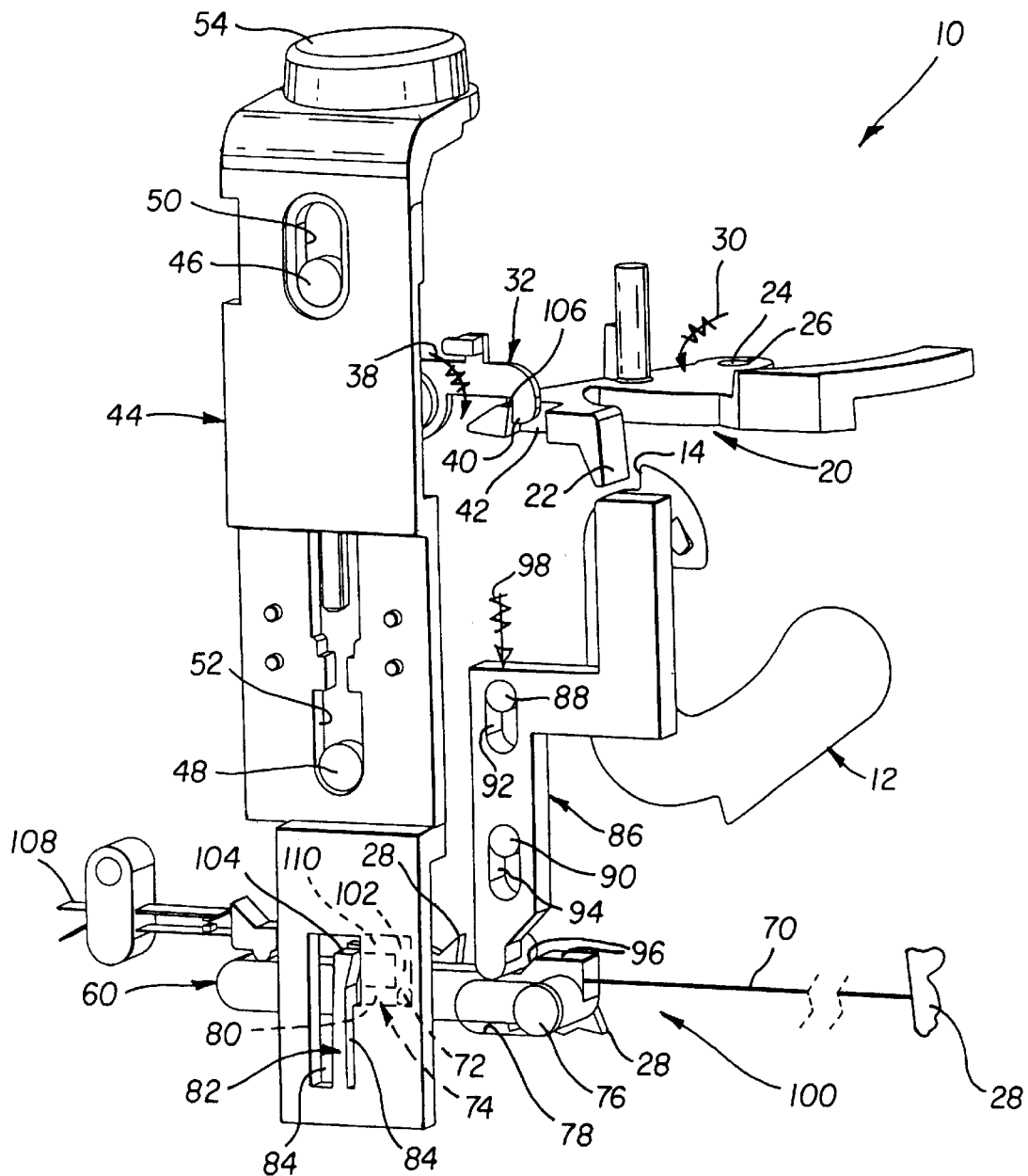
FIG. 1 is a front perspective view of a shutter mechanism according to a preferred embodiment of the invention.
Figure 2:
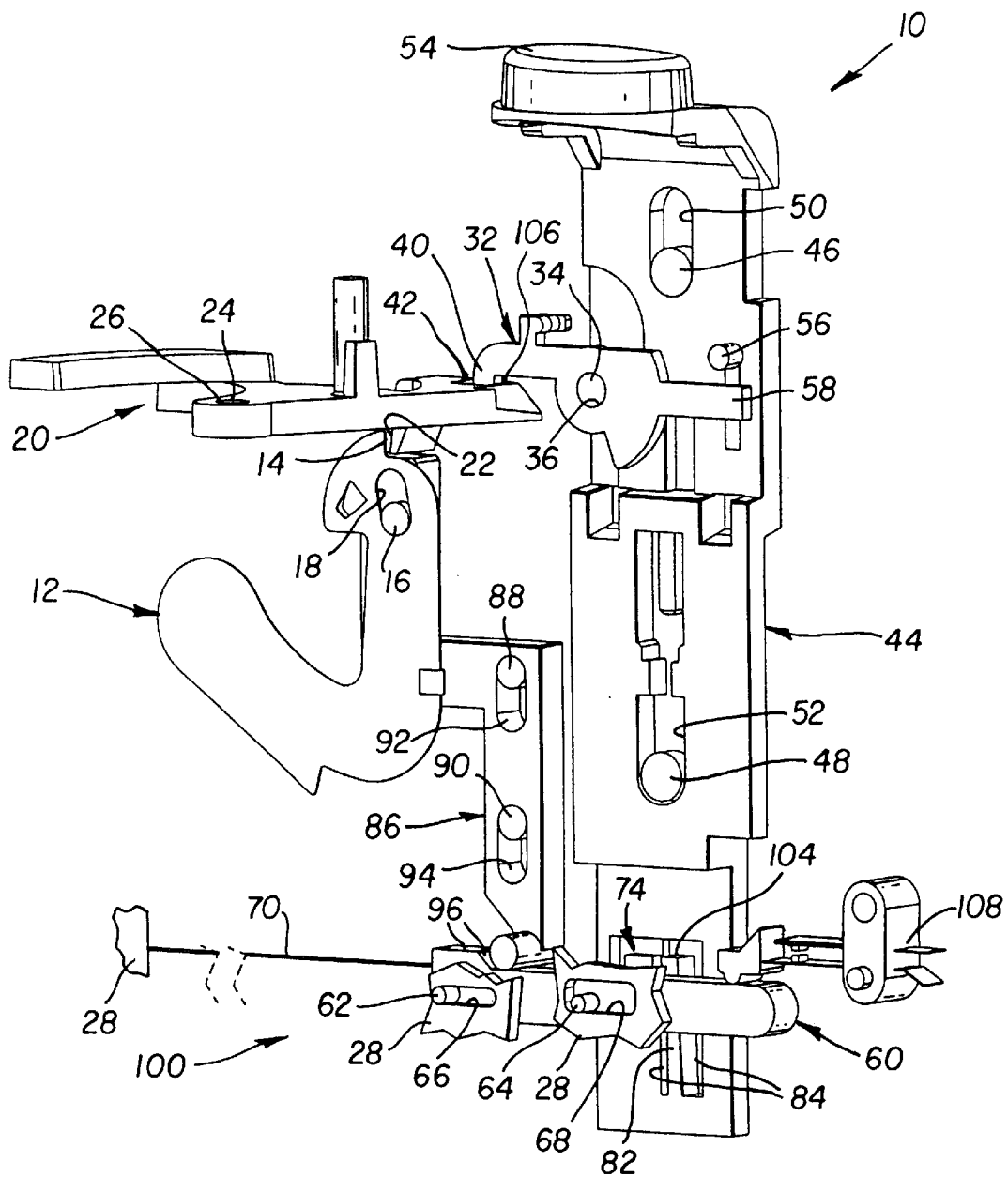
FIG. 2 is a rear perspective view of the shutter mechanism as shown in FIG. 1.

Referring now to the drawings, FIGS. 1 and 2 show a shutter mechanism 10 including a shutter blade 12 that has an impact receiving tip 14 and is pivotally supported via a fixed pin 16 within a slot 18 in the shutter blade, and a shutter actuator 20 that has a striker 22 and is pivotally supported via a fixed pin 24 within an opening 26 in the shutter actuator. The fixed pins 16 and 24 project from a camera main body part 28. An actuating spring 30 pivots the shutter actuator 20 counter-clockwise in FIG. 9 and clockwise in FIG. 10 to swing its striker 22 against the tip 14 of the shutter blade 12 to pivot the shutter blade clockwise in FIG. 9 and counter-clockwise in FIG. 10 about the fixed pin 16. The shutter blade 12 then uncovers an aperture stop (not shown). As soon as the striker 22 swings beyond the tip 14, a return spring (not shown) pivots the shutter blade 12 counter-clockwise in FIG. 9 and clockwise in FIG. 10, for the shutter blade to again cover the aperture stop.

A latch 32 is pivotally supported via a fixed pin 34 within an opening 36 in the latch. The fixed pin 34 projects from the camera main body part 28. A return spring 38 urges the latch 32 clockwise in FIG. 1 and counter-clockwise in FIG. 2 to swing one end 40 of the latch into engagement with the shutter actuator 20 at a notch 42 in the shutter actuator, to prevent the shutter actuator from being pivoted counter-clockwise in FIG. 1 and clockwise in FIG. 2 to swing its striker 22 against the tip 14 of the shutter blade 12 to pivot the shutter blade to uncover the aperture stop.

A manually depressible release member 44 is supported for translation via fixed pins 46 and 48 within respective aligned slots 50 and 52 in the release member. The fixed pins 46 and 48 project from the camera main body part 28. The release member 44 has an integral top push button 54 that protrudes from a top opening in a camera housing (not shown) to permit one to manually depress the release member, and a release pin 56 that pushes against another end 58 of the latch 32 to pivot the latch counter-clockwise in FIG. 5 and clockwise in FIG. 6 to remove the end 40 of the latch from the notch 42 in the shutter actuator 20 when the release member is manually depressed.

A timer member 60 is supported for translation via fixed pins 62 and 64 within respective aligned slots 66 and 68 in the camera main body part 28. The fixed pins 62 and 64 project from the timer member 60. A shaped memory alloy (SMA) control 70, preferably in the form of a metallic fine wire similar to one disclosed in prior art U.S. Pat. No. 5,459,546 (which is incorporated in this patent), has one end secured to the timer member 60 and another end secured to the camera main body part 28. As described in the incorporated patent, the SMA wire 70 can be mechanically deformed (stretched) lengthwise and when subjected to electrical current heats (because of its electrical resistance) to recover (shrink) lengthwise from being deformed. Since the SMA wire 70 is not resilient, it can not recover its original size and shape without heating. The timer member 60 has an integral side guide pin 72 that projects into a reverse-c-shaped open channel 74 in the release member 44, and an integral side push button 76 that protrudes from a side slot 78 in the camera housing and is aligned with the fixed pin 62 in the slot 66. See FIGS. 1 and 2. The push button 76 permits one to manually translate the timer member 60 to the left in FIG. 3 and to the right in FIG. 4, which deforms (stretches) the SMA wire 70 lengthwise and translates the guide pin 72 from one horizontal segment 80 of the reverse-c-shaped channel 74 in the release member 44 to against an upstanding integral resilient finger 82 of the release member that projects within an opening 84 in the release member. The height of the slot 68 is slightly greater than the height of the slot 66 to permit the timer member 60 to be pivoted slightly clockwise in FIG. 7 and counter-clockwise in FIG. 8 at the fixed pin 62 in the slot 66.

A blocking member 86 is supported for translation via fixed pins 88 and 90 within respective aligned slots 92 and 94 in the blocking member. The fixed pins 88 and 90 project from the camera main body part 28. When the timer member 60 is manually translated to the to the left in FIG. 3 and to the right in FIG. 4, a raised motion-inducing or cam portion 96 of the timer member raises the blocking member in FIGS. 3 and 4 to position and hold the blocking member slightly spaced from the striker 22 of the shutter actuator 20 to prevent the striker from swinging against the tip 14 of the shutter blade 12. A return spring 98 urges the blocking member 86 continuously against the timer member 60 as shown in FIGS. 1 and 2.

Operation

The timer member 60, the SMA wire 70, and the blocking member 86 function, in effect, as a settable self-timer 100.

To take a picture without using the self-timer 100, one manually depresses the release member 44 downward in FIGS. 1 and 2 against the continuous upward urging of a return spring (not shown). This causes the release pin 56 on the release member 44 to push against the end 58 of the latch 32 and pivot the latch counter-clockwise in FIG. 5 and clockwise in FIG. 6 to remove the end 40 of the latch from the notch 42 in the shutter actuator 20. The actuating spring 30 then pivots the shutter actuator 20 counter-clockwise in FIG. 9 and clockwise in FIG. 10 to swing its striker 22 against the tip 14 of the shutter blade 12 to pivot the shutter blade clockwise in FIG. 9 and counter-clockwise in FIG. 10 about the fixed pin 16 on the main body part 28. The shutter blade 12 then uncovers the aperture stop. As soon as the striker 22 swings beyond the tip 14, the return spring pivots the shutter blade 12 counter-clockwise in FIG. 9 and clockwise in FIG. 10, for the shutter blade to again cover the aperture stop.

When the release member 44 is manually depressed downward in FIGS. 1 and 2, without using the self-timer 100, a vertical segment 102 of the reverse-c-shaped channel 74 in the release member is lowered along the guide pin 72 on the timer member 60. The timer member 60 remains stationary.

Figure 3:
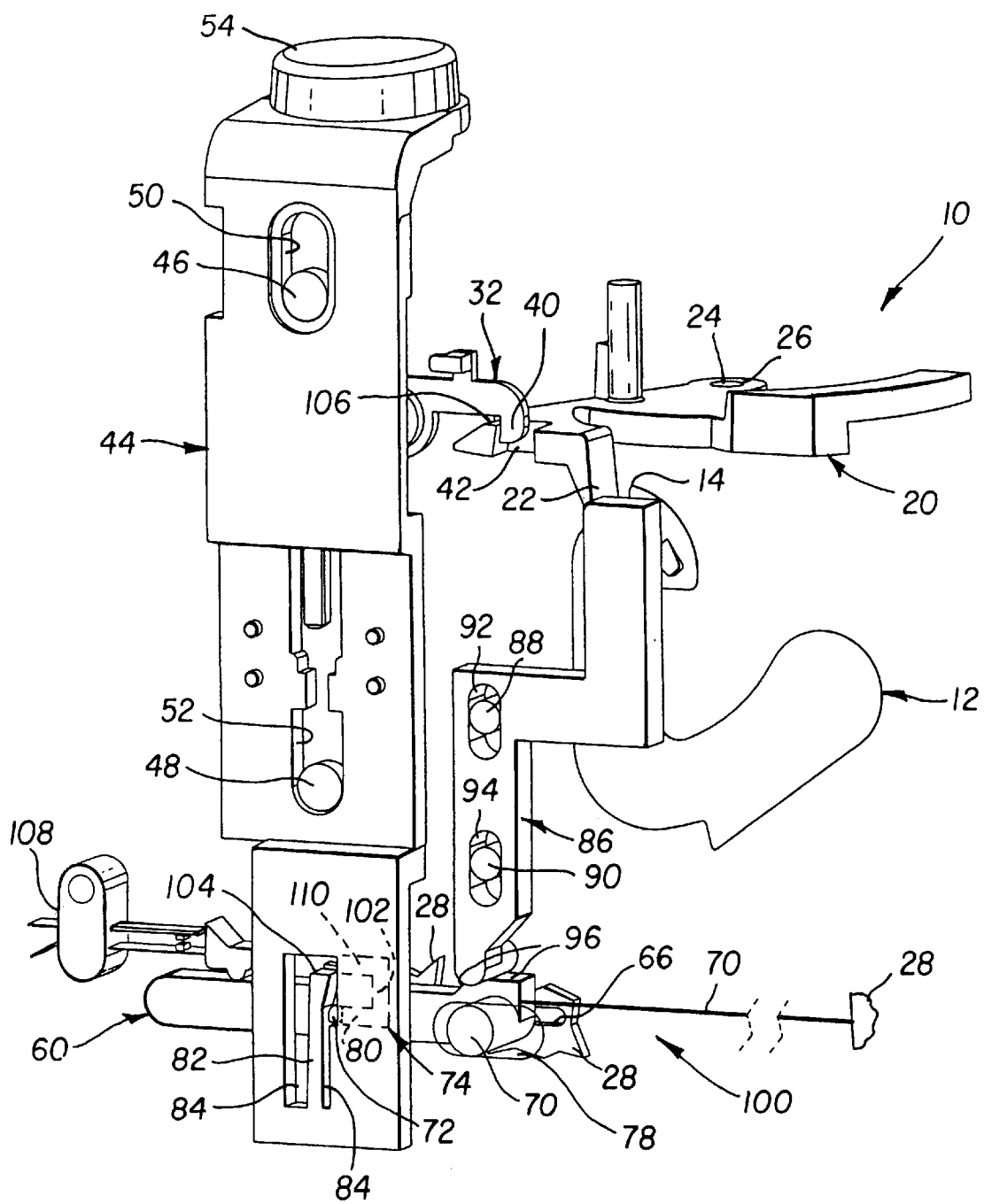
FIGS. 3–10 are alternate front and rear perspective views of the shutter mechanism, depicting its operation.
Figure 4:
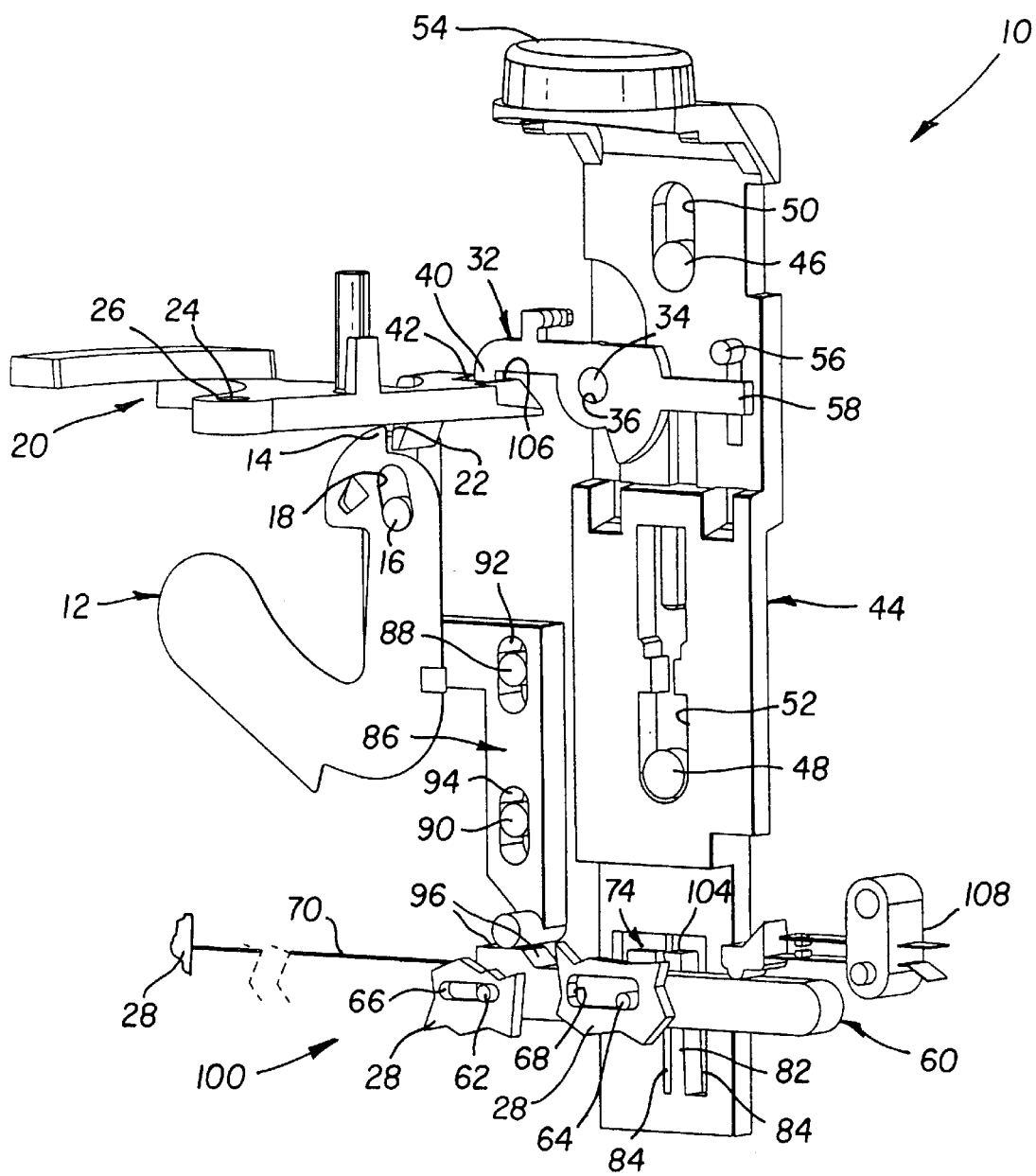

To take a picture using the self-timer 10, one manually translates the timer member 60 to the left in FIG. 3 and to the right in FIG. 4, which mechanically deforms (stretches) the SMA wire 70 lengthwise and translates the guide pin 72 on the timer member from the segment 80 of the reverse-c-shaped channel 74 in the release member 44 to against the resilient finger 82 of the release member 44 that projects within the opening 84 in the release member. The raised motion-inducing portion 96 of the timer member 60 raises the blocking member 86 in FIGS. 3 and 4 to position and hold the blocking member slightly spaced from the striker 22 of the shutter actuator 20 to prevent the striker from swinging against the tip 14 of the shutter blade 12.

At this stage, the self-timer 100 is set. However, the timer-member 60 can be manually reverse-moved to the right in FIG. 3 and to the left in FIG. 4 to cancel setting the self-timer 100. If the timer member 60 is reverse-moved, the SMA wire 70 becomes slack or droops, the guide pin 72 on the timer member 60 is translated from against the resilient finger 82 of the release member 44 and into the horizontal segment 80 of the reverse-c-shaped channel 74 in the release member, and the raised motion-inducing portion 96 of the timer member 60 is retracted from the blocking member 86. The return spring 98 then lowers the blocking member 86 in FIGS. 3 and 4 out of the way of the striker 22 of the shutter actuator 20 and against the timer member 60.

Figure 5:
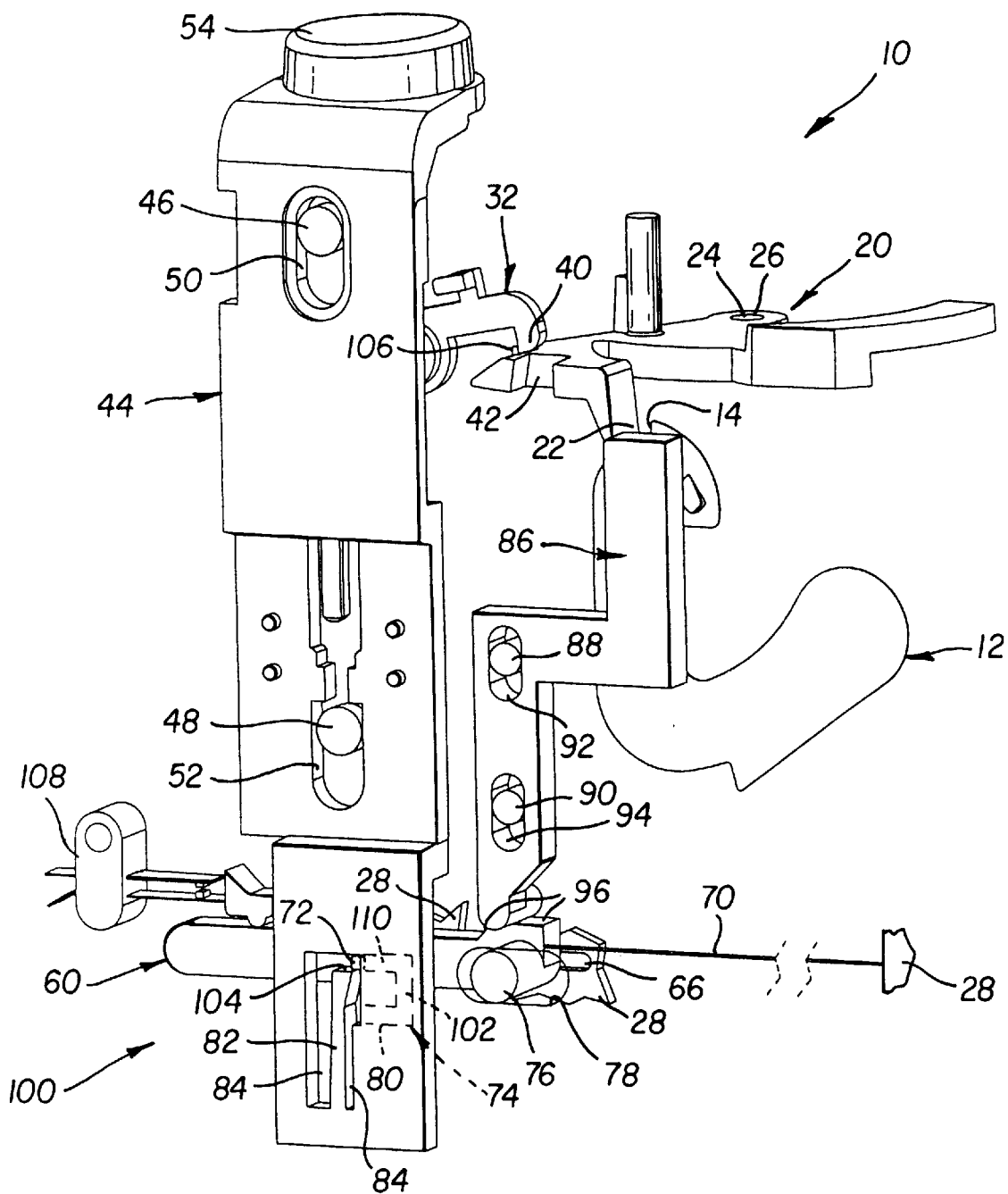
Figure 6:
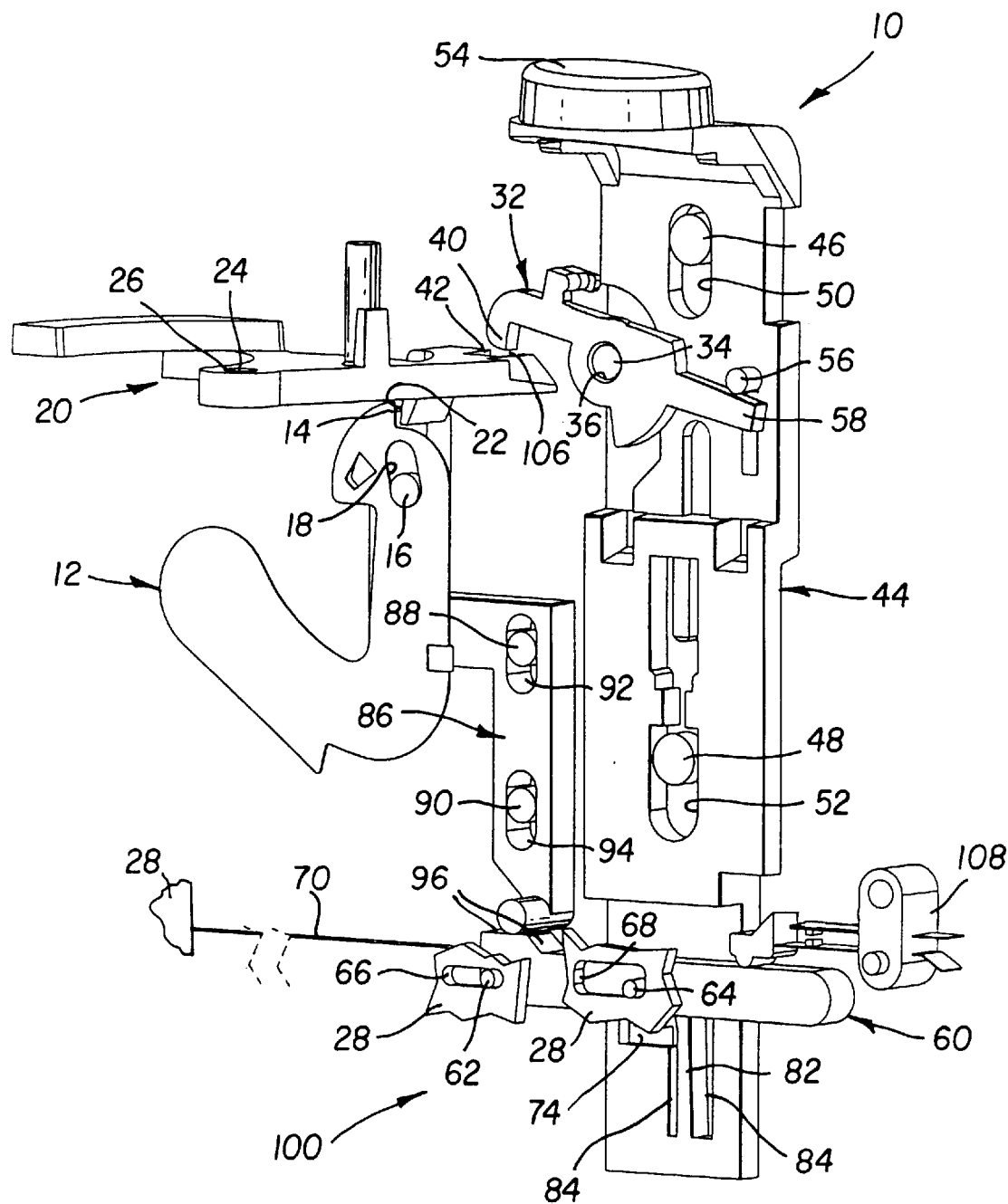

If one manually depresses the release member 44 downward in FIGS. 5 and 6 against the continuous upward urging of the return spring, when the self-timer 100 is set, the resilient finger 82 of the release member is lowered in FIGS. 5 and 6 and the guide pin 72 on the timer member 60 is captured (engaged) via the top end 104 of the resilient finger as shown in FIG. 5. In addition, the release pin 56 on the release member 44 pushes against the end 58 of the latch 32 to pivot the latch counter-clockwise in FIG. 5 and clockwise in FIG. 6 to remove the end 40 of the latch from the notch 42 in the shutter actuator 20. The actuating spring 30 then pivots the shutter actuator 20 slightly counter-clockwise in FIG. 5 and clockwise in FIG. 6 to move a stop portion 106 of the shutter actuator beneath the latch 32 to be able to hold the latch substantially in place when the return spring raises the release member 44. The raised motion-inducing portion 96 of the timer member 60 continues to hold the blocking member 86 in position to prevent the striker 22 of the shutter actuator 20 from swinging against the tip 14 of the shutter blade 12.

At this stage, the setting of the self-timer-100 cannot be cancelled because the guide pin 72 on the timer member 60 is captured (engaged) via the top end 104 of the resilient finger 82 of the release member 44 as shown in FIG. 5

Figure 7:
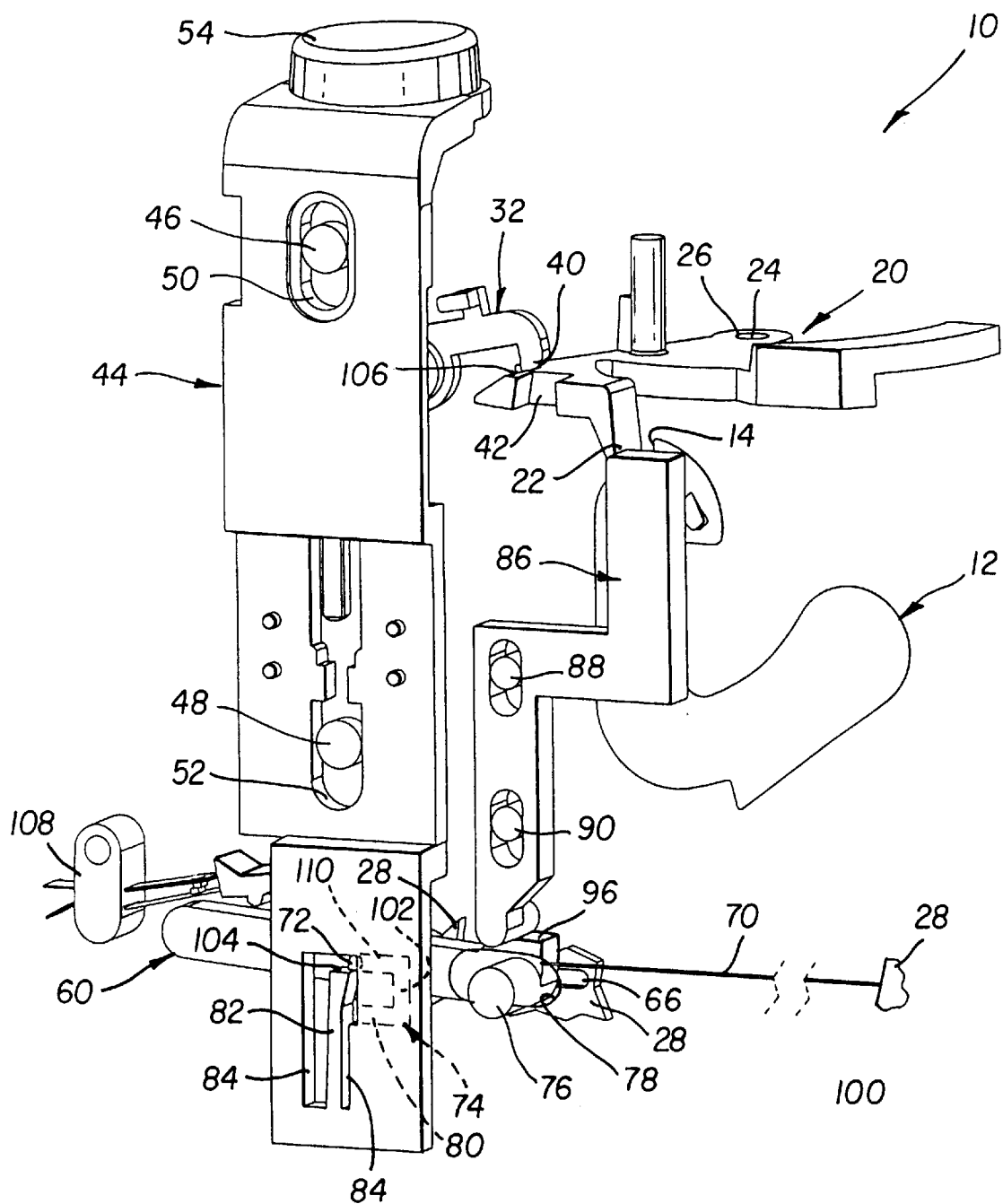
Figure 8:
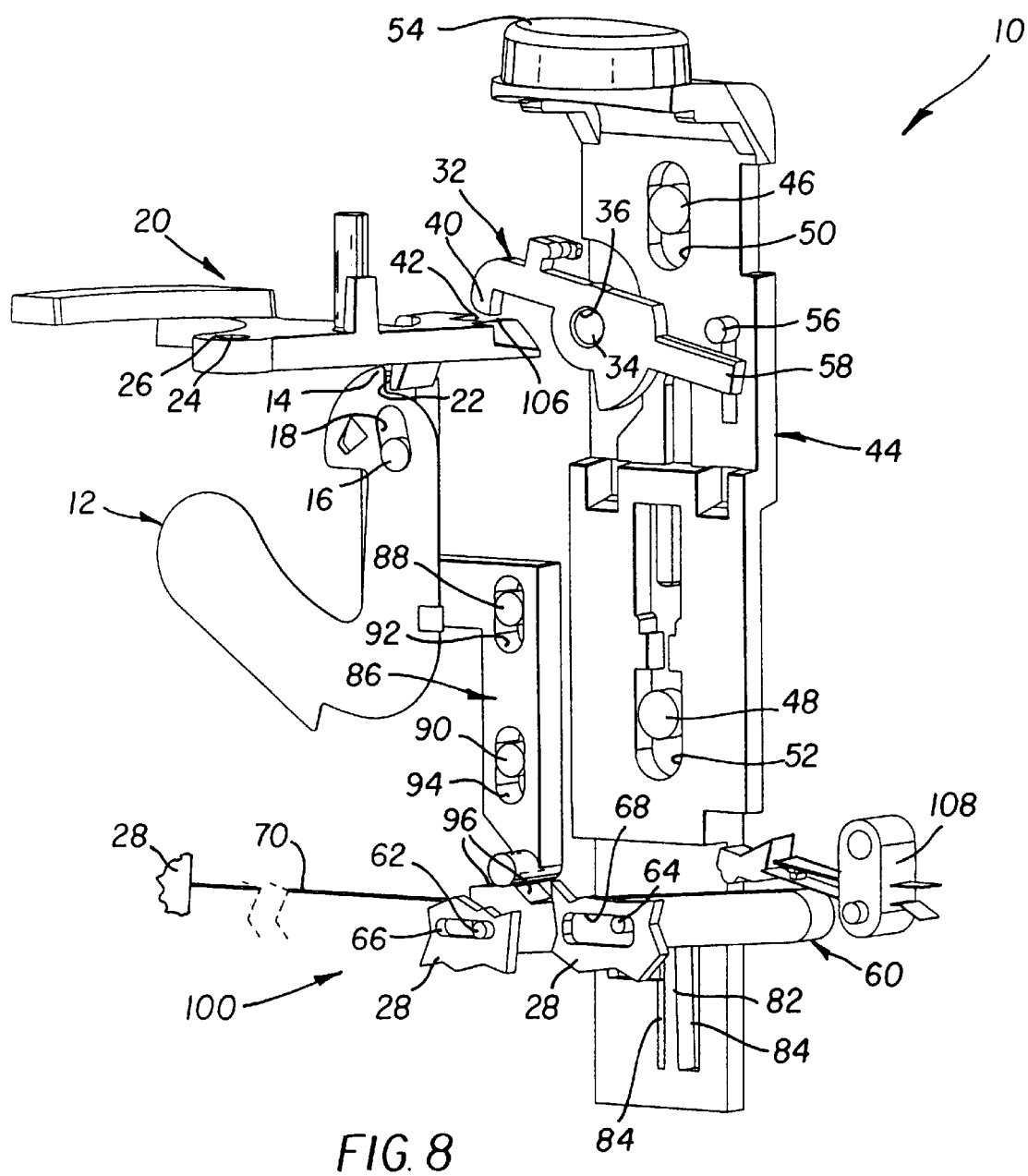

When one ceases to hold the release member 44 manually depressed downward, in FIGS. 7 and 8 the return spring begins to raise the release member upward. Initially, the release pin 56 on the release member 44 is removed from against the end 58 of the latch 32, which allows the return spring 38 to pivot the latch slightly clockwise in FIG. 7 and counter-clockwise in FIG. 6 to against the stop portion 106 of the shutter actuator 20, and the top end 104 of the resilient finger 82 of the release member pushes against the guide pin 72 on the timer member 60 to slightly pivot the timer member clockwise in FIG. 7 and counter-clockwise in FIG. 8 at the fixed pin 62 on the timer member, in the slot 66 in the main body part 28. The timer member 60 then closes a biased-open switch 108 in a known electrical circuit (not shown) which includes the SMA wire 70, to subject the SMA wire to electrical current that heats the SMA wire to cause it to begin to recover (shrink) lengthwise from being mechanically deformed (stretched). The raised motion-inducing portion 96 of the timer member 60 continues to hold the blocking member 86 in position to prevent the striker 22 of the shutter actuator 20 from swinging against the tip 14 of the shutter blade 12.

Figure 9:
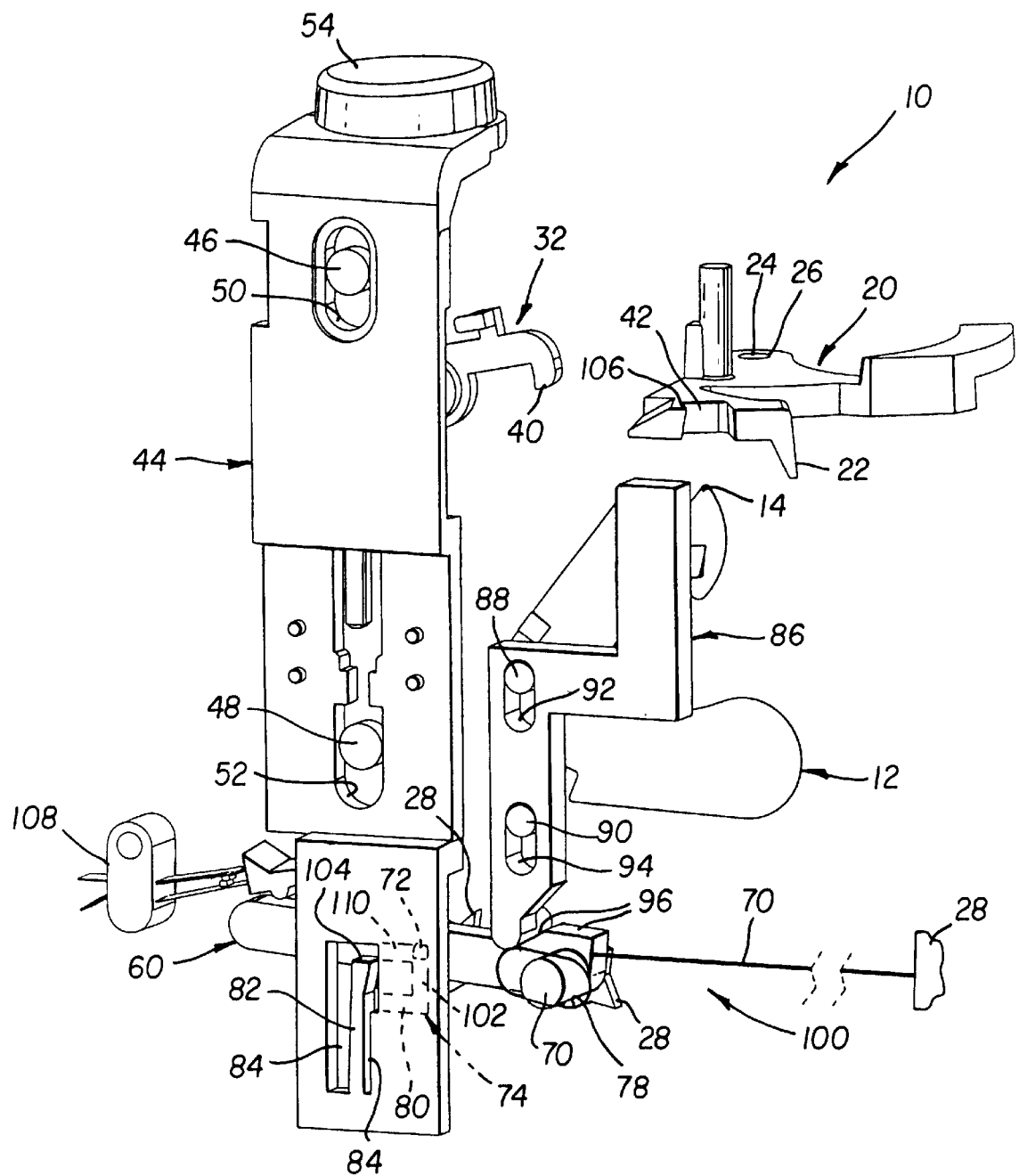
Figure 10:
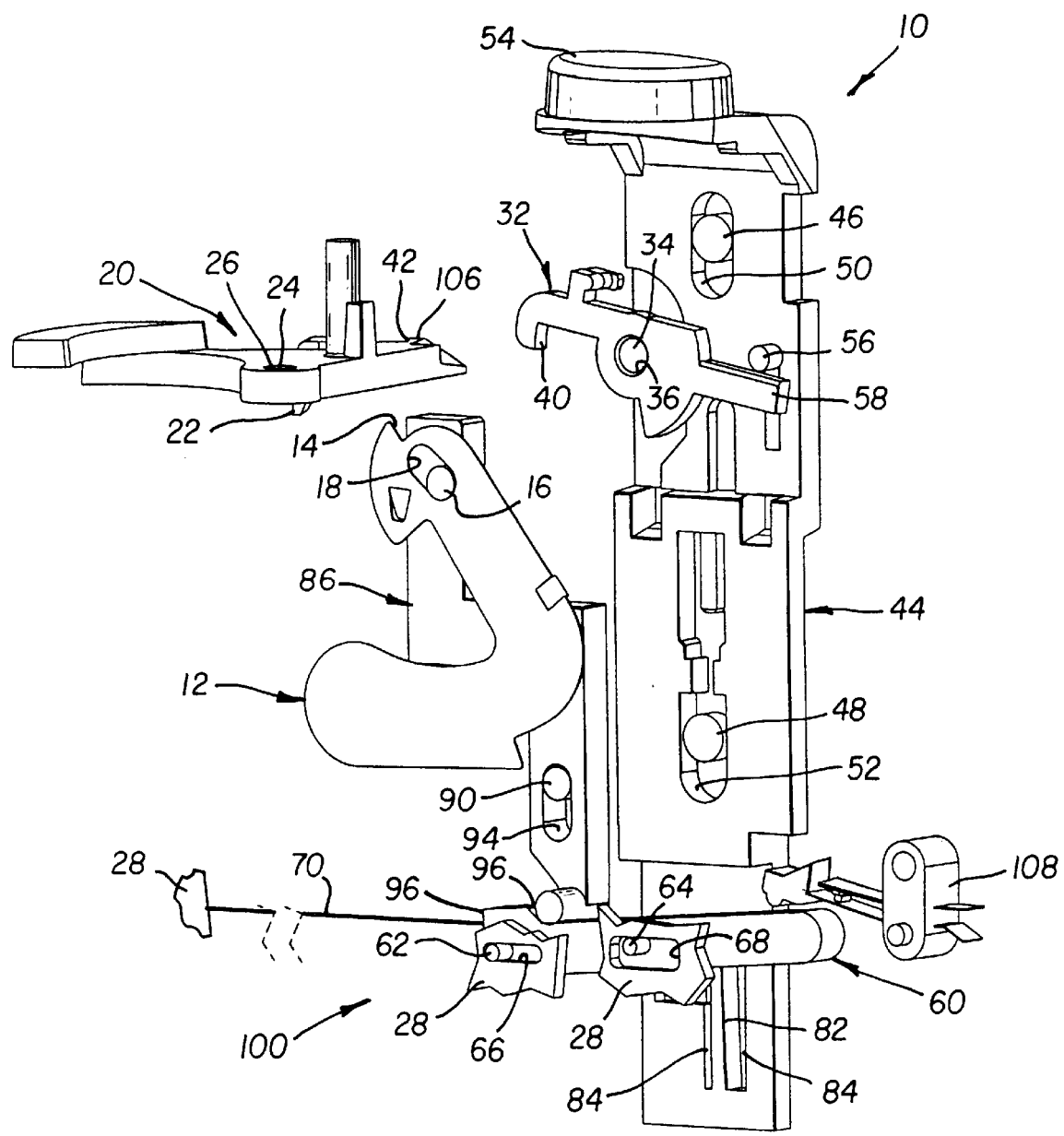

When the SMA wire 70 recovers (shrinks) lengthwise as shown in FIGS. 9 and 10, it translates the timer member 60 to the right in FIG. 9 and to the left in FIG. 10, which causes the raised motion-inducing portion 96 of the timer member to be retracted from the blocking member 86. The return spring 98 then lowers the blocking member 86 in FIGS. 9 and 10 out of the way of the striker 22 of the shutter actuator 20 and against the timer member 60. The actuating spring 30 pivots the shutter actuator 20 counter-clockwise in FIG. 9 and clockwise in FIG. 10 to swing its striker 22 against the tip 14 of the shutter blade 12 to pivot the shutter blade clockwise in FIG. 9 and counter-clockwise in FIG. 10 about the fixed pin 16 on the main body part 28. The shutter blade 12 then uncovers the aperture stop. As soon as the striker 22 swings beyond the tip 14, the return spring pivots the shutter blade 12 counter-clockwise in FIG. 9 and clockwise in FIG. 10, for the shutter blade to again cover the aperture stop.

As the SMA wire 70 recovers (shrinks) lengthwise as shown in FIGS. 9 and 10 and translates the timer member 60 to the right in FIG. 9 and to the left in FIG. 10, the guide pin 72 on the timer member 60 is translated from the top end 104 of the resilient finger 82 of the release member 44 and into another horizontal segment 110 of the reverse-c-shaped channel 74 in the release member. When the guide pin 72 is translated from the horizontal segment 110 of the reverse-c-shaped channel 74 to the vertical segment 102 of the reverse-c-shaped channel as shown in FIG. 9, the return spring can further raise the release member 44 upward and the biased open switch 108 can slightly pivot the timer member 60 counterclockwise in FIG. 9 and clockwise in FIG. 10 at the fixed pin 62 on the timer member, in the slot 66 in the main body part. The biased-open switch 108 then opens to discontinue the flow of electrical current in the SMA wire 70. The timer member 60 comes to rest as shown in FIG. 1. And the return spring raises the release member 44 upward to return the guide pin 72 to the horizontal segment 80 of the reverse-c-shaped channel as shown in FIG. 1.

The invention has been described with reference to a preferred embodiment. However, it will be appreciated that variations and modifications can be effected by a person of ordinary skill in the art without departing from the scope of the invention.

PARTS LIST 10. shutter mechanism
12. shutter blade
14. impact receiving tip
16. fixed pin
18. slot
20. shutter actuator
22. striker
24. fixed pin
26. opening
28. main body part
30. actuating spring
32. latch
34. fixed pin
36. opening
38. return spring
40. latch end
42. notch
44. release member
46. fixed pin
48. fixed pin
50. slot
52. slot
54. push button
56. release pin
58. latch end
60. timer member
62. fixed pin
64. fixed pin
66. slot
68. slot
70. shaped memory alloy control
72. guide pin
74. reverse-c-shaped channel
76. push button
78. side slot
80. horizontal segment
82. resilient finger
84. opening
86. blocking member
88. fixed pin
90. fixed pin
92. slot
94. slot
96. motion-inducing portion
98. return spring
100. self-timer
102. vertical segment
104. top end
106. stop portion
108. switch
110. horizontal segment

What is claimed is:

1. A shutter mechanism comprising a shutter that is operated to allow the passage of light, and a self-timer with a shaped memory alloy control that can be deformed and that when subjected to electrical current heats to recover from being deformed and after some delay during recovery initiates operation of said shutter, is characterized in that:

a manually set timer member is connected to said shaped memory alloy control and is supported to be manually moved to deform said shaped memory alloy control to set said self-timer and for said shaped memory alloy control to reverse-move said timer member during recovery of said shaped memory alloy control.

2. A shutter mechanism as recited in claim 1, wherein said timer member is supported to be manually reverse-moved to cancel setting said self-timer after being manually moved to deform said shaped memory alloy control.

3. A shutter mechanism as recited in claim 1, wherein a shutter actuator is movable to operate said shutter, a blocking member can be positioned to prevent movement of said shutter actuator to operate said shutter, and said timer member has a motion-inducing portion that positions and holds said blocking member to prevent movement of said shutter actuator when said timer member is manually moved to deform said shaped memory alloy control.

4. A shutter mechanism as recited in claim 3, wherein said timer member is supported to be manually reverse-moved to cancel setting said self-timer after being manually moved to deform said shaped memory alloy control, and said motion-inducing portion separates from said blocking member to free said blocking member from preventing movement of said shutter actuator when said timer member is reverse-moved.

5. A shutter mechanism as recited in claim 4, wherein a release member is supported to be manually depressed for movement into engagement with said timer member to prevent said timer member from being reverse-moved.

6. A shutter mechanism as recited in claim 5, wherein a biased-open switch can be closed to subject said shaped memory alloy control to electrical current to heat said shaped memory alloy control, said timer member is supported to be moved to close said switch without said motion-inducing portion separating from said blocking member, and said release member is supported to be raised after being manually depressed and moves said timer member to close said switch when said release member is initially raised.

7. A shutter mechanism as recited in claim 6, wherein said release member releases said timer member from engagement to prevent said timer member from being reverse-moved when said release member moves said timer member to close said switch.

8. A shutter mechanism as recited in claim 6, wherein a latch is urged to engage with said shutter actuator to prevent movement of said shutter actuator to operate said shutter and can be moved to release said shutter actuator, and said release member moves said latch to release said shutter actuator when said release member is manually depressed and allows said latch to re-engage with said shutter actuator when said release member is raised.

9. A shutter mechanism as recited in claim 1, wherein said shaped memory alloy control is stretched to be deformed and shrinks to recover its size and shape only when heated, and said timer member stretches said shaped memory alloy control to deform said shaped memory alloy control when said timer member is manually moved to set said self-timer and is supported to be manually reverse-moved to cancel setting said self-timer and allow said shaped memory alloy control to become slack.

10. A method of using a self-timer with a shaped memory alloy control to delay operation of a shutter, said method comprising:

moving a timer member connected to the shaped memory alloy control for the timer member to deform the shaped memory alloy control member and to position and hold a blocking member to prevent movement of a shutter actuator from operating the shutter; and subjecting the shaped memory alloy control member to electrical current to heat it to cause it to recover after being deformed, for the shaped memory alloy control to reverse move the timer member to free the blocking member from preventing movement of the shutter actuator after some delay during recovery of the shaped memory alloy control.

11. A method of using a self-timer to delay operation of a shutter, said method comprising:

moving a timer member for the timer member to position and hold a blocking member to prevent movement of a shutter actuator from operating the shutter, but allowing the timer member to be reverse-moved to free the blocking member from preventing movement of the shutter actuator;

depressing a release member into engagement with the timer member to prevent the timer member from being reverse-moved;

raising the release member to release the timer member from engagement to allow the timer member to be-reverse-moved; and reverse-moving the timer member.

12. A method of setting a self-timer with a shaped memory alloy control to delay operation of a shutter and then canceling setting the self-timer, said method comprising:

moving a timer member connected to the shaped memory alloy control for the timer member to deform the shaped memory alloy control by stretching it; to set the self-timer; and reverse-rotating the timer member to cancel setting the self-timer, and allowing the shaped memory alloy control to become slack.

* * * * *